US006180048B1

(12) United States Patent
Katori

(10) Patent No.: US 6,180,048 B1
(45) Date of Patent: *Jan. 30, 2001

(54) MANUFACTURING METHOD OF COLOR KEYPAD FOR A CONTACT OF CHARACTER ILLUMINATION RUBBER SWITCH

(75) Inventor: Masaya Katori, Tokyo (JP)

(73) Assignee: Polymatech Co., Ltd. (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/325,907

(22) Filed: Jun. 4, 1999

Related U.S. Application Data

(63) Continuation-in-part of application No. 08/967,748, filed on Nov. 10, 1997, now abandoned.

(30) Foreign Application Priority Data

Dec. 6, 1996 (JP) .......... 8-340427

(51) Int. Cl.[7] .......... B29C 35/08

(52) U.S. Cl. .......... 264/400; 264/132; 264/139; 264/255

(58) Field of Search .......... 264/400, 132, 264/139, 255, 250; 219/121.69; 427/554

(56) References Cited

U.S. PATENT DOCUMENTS

| | | | | |
|---|---|---|---|---|
| 3,410,979 | * | 11/1968 | Larsson | 219/121 |
| 4,328,410 | * | 5/1982 | Silvinsky et al. | 219/121 LJ |
| 5,182,188 | * | 1/1993 | Cole, Jr. et al. | 430/323 |
| 5,456,955 | * | 10/1995 | Muggli | 427/555 |
| 5,723,843 | * | 3/1998 | Muggli | 219/121.69 |

* cited by examiner

*Primary Examiner*—Jan H. Silbaugh
*Assistant Examiner*—Edmund H Lee
(74) *Attorney, Agent, or Firm*—McGlew and Tuttle, P.C.

(57) ABSTRACT

A manufacturing method of a keypad for a contact character illumination rubber switch composed of a surface enriched in color design variations is provided. The method includes forming a black or gray intermediate layer (3) on a surface portion of a color keypad member (1) for a contact character illumination switch of the mobile communication system, electric equipment components for cars or the like. A colored surface layer (4) is formed thereon with any color. A laser beam is applied from the upper side thereof for burning up and removing the intermediate layer and the colored surface layer.

11 Claims, 1 Drawing Sheet

MANUFACTURING METHOD OF COLOR KEYPAD FOR A CONTACT OF CHARACTER ILLUMINATION RUBBER SWITCH

RELATED APPLICATIONS

This is a continuation in part of application Ser. No. 08/967,748 filed Nov. 10, 1997 now abandoned, and the entire disclosure of this prior application is considered to be part of the disclosure of the accompanying application and is hereby incorporated by reference therein.

FIELD OF THE INVENTION

The present invention relates to a manufacturing method of a color keypad for a contact element of a character illumination rubber switch in a mobile communication systems and electrical equipment for car use.

BACKGROUND OF THE INVENTION

The manufacturing method of a keypad for a contact of character illumination rubber switch made by rubber, which illuminates only either characters or figures, is already well known through the Japan Patent Publication No. HEISEI 5-32850. In this method, a laser beam is irradiated so that the laser beam energy is absorbed into a colored surface layer in the shapes of characters and burns the layer off it.

In order to remove the colored surface layer by means of the laser beam it is necessary to arrange materials such as carbon black on the surface so that the laser beam is readily absorbed into the colored layer. Therefore the available keypads manufactured by irradiating laser beam currently have only dark colors such as black or gray or the like as the colored surface layer. It is possible to emit the laser beam on the colored surface layer of any colors which are not black or gray and to burn it off it. However, the incomplete removal thereof is readily caused within the colored surface layer because the colored surface layer do not completely absorb the laser beam. Moreover, if by increasing the irradiation dose of the laser beam the colored surface layer is removed, removal or burning thereof is caused on the lower colored light permeable layer. Accordingly, by using such a laser beam unit, it is difficult to obtain high quality products and successful marketing of the product can not be realized

SUMMARY AND OBJECTS OF THE INVENTION

It is the primary object of the present invention to manufacture a keypad having color variations which are needed, especially by women and young people, and to provide these color variations for the color keypad for illuminated character contact is mobile communication systems and electrical equipment car components.

The present invention relates to a manufacturing method of a keypad for a contact of character illumination rubber switch. The switch includes a surface enriched in color design variations. The method includes the steps of forming a black or gray intermediate layer over a surface section of a color keypad member for a contact of a character illumination switch of the mobile communication systems, electric equipment or the like. A colored surface layer is formed thereon with any color, especially a colored surface layer which substantially passes the laser beam and is substantially unremovable by the passing of the laser beam through the color surface layer. A laser beam is applied from the upside thereof for passing through the colored surface layer and burning up and removing the intermediate layer. The colored surface layer and the intermediate layer being chosen of a material to have burning up and removal of the intermediate layer by the laser cause removal of the colored surface layer adjacent the burned portions of the intermediate layer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
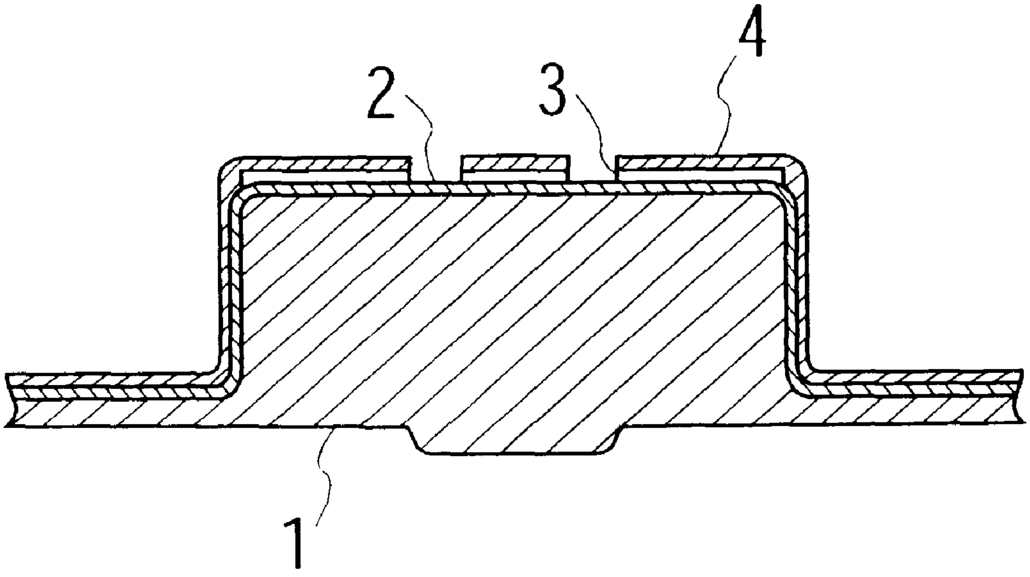
FIG. 1 is a cross section view of a keypad according to the present invention.
Figure 2:
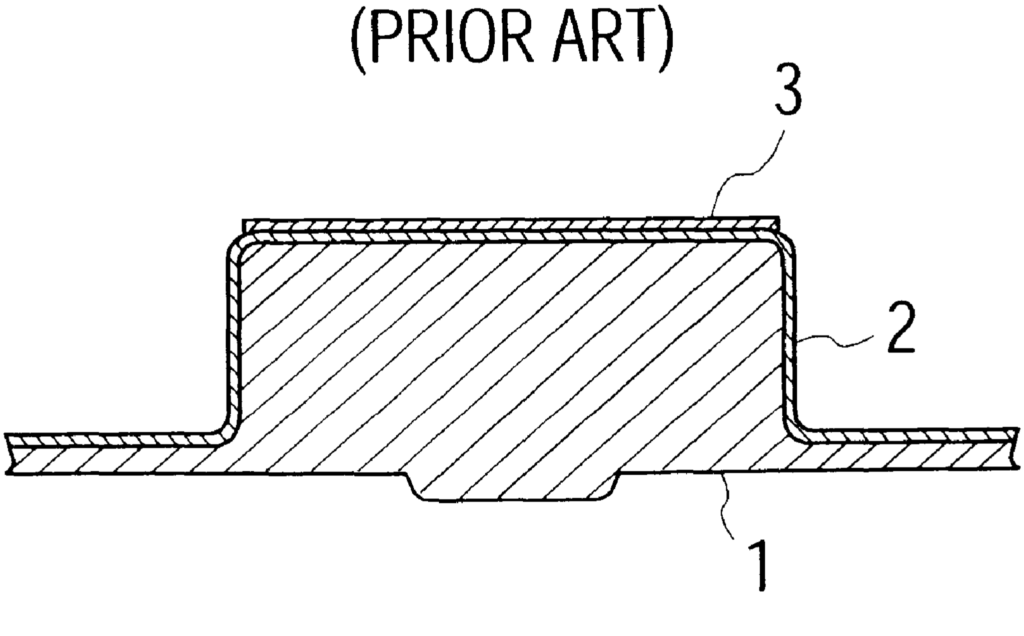
Figure 2 (PRIOR ART)
FIG. 2 is a cross section view of a conventional keypad.

Now the present invention will be described more in detail referring to the embodiment as shown in FIG. 2. A body of keypad 1 is formed with transparent or semi-transparent elastic material. Such elastic material includes natural rubber (polyisoprene rubber), butadiene rubber, styrene butadiene rubber, chloroprene rubber, nitryl rubber, butyl rubber, ethylene propylene rubber, acrylic rubber, silicone rubber, fluoric rubber, urethane rubber, other synthetic rubber, or styrene base, olefin base, ester base, urethane base thermoplastic elastomer. Over the face thereof, a colored translucent layer 2, a black or gray dark colored intermediate layer 3 and a colored surface layer 4 are formed by painting or printing with polyester base, silicone base or various liquid rubber (urethane base, diene base, polybutene base). For painting methods, reciprocation, air, rotary or other well-known methods are employed, while for printing, screen, offset, PAD or other well-known methods are employed. The colored surface layer 4 is of a material which substantially passes a laser beam and is incompletely or substantially unremoved by passing of the laser beam through the colored surface layer. The colored surface layer 4 is substantially unabsorbing of the laser beam. The intermediate layer 3 is of a material to burn up and withdraw from the colored translucent layer 2 when irradiated by the laser beam. Both the materials and thicknesses of the colored surface layer 4 and the intermediate layer 3 are chosen to have burning up and removal of the intermediate layer 3 by the absorption of laser beam cause removal of the colored surface layer 4 adjacent the burned portions of the intermediate layer 3.

Thereafter, a laser beam is applied to the intermediate layer 3 from the upper side of this colored surface layer 4, to remove material in character or graphic pattern shaped portions. When this intermediate layer 3 is removed, the colored surface layer 4 will be also removed at the same time. Thus, a keypad is realized with its colored surface with any color.

EXAMPLE

A transparent or semi-transparent silicone rubber is molded by a metal die of a keypad shape to form or provide a keypad shaped element or member 1. A colored translucent layer 2 is coated on the keypad shaped element 1 using silicone ink white (made by Toshiba Silicone Ltd.) in order to form a colored translucent layer base. The layer is 20 parts by weight of hardener added to 100 parts by weight of silicone ink.

Next, as an intermediate layer 3, silicone ink black (made by Toshiba Silicone Ltd.) is formed thereon in the shape of a key top by silk screen printing. At this time, the key top printing may also be applied with gray silicone ink mixing conveniently white ink and black ink (made by Toshiba Silicone Ltd.) as the intermediate layer 3.

Finally, 30 parts by weight of Color Master Red (made by Toshiba Silicone Ltd.) are added to 100 parts by weight of Silicone Ink Clear (made by Toshiba Silicone Ltd.) as an ink used for the colored surface layer 4, the liquid obtained as the result is mixed enough, diluted with solvent and coated on the key top surface. Furthermore, on this occasion, 20 parts by weight of the hardener are added to 100 parts by weight of silicone ink.

Regarding the silicone rubber keypad coated as mentioned above, the intermediate layer 3 and the colored surface layer 4 are removed at the same time by a laser marker (made by Fuji Electric Ltd.). As the result, the colored surface layer and the intermediate layer can be removed in the same shape of the given character and/or symbol as the keypad for conventional black, gray or other character illuminating rubber switch contacts.

Same results are obtained, using blue, green and brown as the colored surface layer 4 and, with a same arrangement as the example above. Moreover, a wide variety of color variation can be realized by preparing color masters of the colored surface layer.

The thickness of the colored surface layer 4 is set within the range of 50 $\mu$m or less depending on the laser output energy conditions of the laser machine, however, preferably 20 to 30 $\mu$m is appropriate. At 15 $\mu$m or less, in some cases, the color of the intermediate layer 3 becomes visible through the colored surface layer and the color is not distinct in respect of the outside appearance. At 50 $\mu$m or more, the energy efficiency of the intermediate layer is deteriorated. Further, this increases the processing time and it makes it easier to remove some of the colored surface layer.

By using this method of manufacturing, any colors other than black can be selected for the colored surface layer which has the widest area in respect to the outside appearance. This permits a rich variation of key top color design.

Additionally, products presenting desired qualities, and strongly demanded especially by women and young people, can be manufactured without suffering deterioration of any characters or figures such as discoloration due to the fading of the colored transparent or translucent layer.

While specific embodiments of the invention have been shown and described in detail to illustrate the application of the principles of the invention, it will be understood that the invention may be embodied otherwise without departing from such principles.

What is claimed is:

1. A method of manufacturing a keypad member with a character illumination expressed and formed in a colored transparent or colored translucent layer, the method comprising the steps of:

forming a colored transparent or colored translucent layer over a surface portion of a keypad member for a contact, the keypad member being made up of rubber molded by using transparent or semitransparent elastic materials, said elastic material is selected from a group consisting of natural rubber (polyisoprene rubber, butadiene rubber, styrene butadiene rubber, chloroprene rubber, nitryl rubber, butyl rubber, ethylene propylene rubber, acrylic rubber, silicone rubber, fluoric rubber, urethane rubber, styrene base thermoplastic elastomer, olefin base thermoplastic elastomer, ester base thermoplastic elastomer and urethane base thermoplastic elastomer;

applying a dark layer, which is one of a silicone ink black layer, a gray layer or a dark color layer, on said colored transparent or colored translucent layer, said dark layer being applied as an intermediate layer for enhancing optical energy absorption;

forming a colored surface layer on said intermediate layer with silicone ink having a color or colors other than black and gray, said surface layer having a thickness set within a range from 50 $\mu$m to 15 $\mu$m and being substantially unabsorbing of a laser beam and substantially unremovable directly by said laser beam;

irradiating said colored surface layer with said laser beam in the shape of characters or figures;

burning up said intermediate layer by absorption of the energy of said laser beam; and at the same time, burning up and removing said colored surface layer in the shape of the characters or figures by said burning of said intermediate layer.

2. The method in accordance with claim 1, wherein:

said intermediate layer is formed of a material to burn up and withdraw from said colored translucent or transparent layer when irradiated by the laser beam.

3. The method in accordance with claim 1, wherein:

said intermediate layer and said colored surface layer are formed of a material and thickness to have burning up and removal of said intermediate layer by the laser cause removal of said colored surface layer adjacent burned portions of said intermediate layer.

4. A method of manufacturing a keypad for a contact of a character illumination rubber switch made up of rubber, in which a colored transparent or colored translucent layer of any color is expressed and formed, the method comprising the steps of:

forming a keypad member of rubber molded by using transparent or semitransparent elastic materials, said keypad member having a surface portion, said elastic materials is selected from a group consisting of natural rubber (polyisoprene rubber), butadiene rubber, styrene butadiene rubber, chloroprene rubber, nitryl rubber, butyl rubber, ethylene propylene rubber, acrylic rubber, silicone rubber, fluoric rubber, urethane rubber, styrene base thermoplastic elastomer, olefin base thermoplastic elastomer, ester base thermoplastic elastomer, and urethane base thermoplastic elastomer;

forming a colored transparent or colored translucent layer over said surface portion of a keypad member;

applying a dark layer, which is one of a black layer, gray layer or a dark color layer, on said colored transparent or colored translucent layer, said dark layer being applied as an intermediate layer for enhancing optical energy absorption;

forming a colored surface layer on said intermediate layer with a color or colors other than black and gray, said surface layer being substantially unabsorbing of a laser beam and incompletely removable by said laser beam;

irradiating said colored surface layer with a laser beam in the shape of characters or figures;

burning up said intermediate layer by absorption of the energy of said laser beam and at the same time, burning up and removing said colored surface layer in the shape of the characters or figures by said burning of said intermediate layer.

5. The method in accordance with claim 4, wherein:

said intermediate layer is formed of a material to burn up and withdraw from said colored translucent or transparent layer when irradiated by the laser beam.

6. The method in accordance with claim 4, wherein:

said intermediate layer and said colored surface layer are formed of a material and thickness to have burning up and removal of said intermediate layer by the laser cause removal of said colored surface layer adjacent burned portions of said intermediate layer.

7. A method of manufacturing a keypad member with an illumination character, the method comprising the steps of:

providing a keypad member formed of transparent elastic material;

applying a base layer over a surface portion of said keypad member, said base layer being one of a colored transparent or a colored translucent layer;

applying an intermediate layer on said base layer, said intermediate layer being removable by absorption of a laser beam and selected from a group consisting of silicone ink black layer, a silicone ink gray layer, and a silicone ink dark color layer;

applying a colored surface layer to said intermediate layer, said surface layer substantially passing said laser beam and being incompletely removable by said passing of said laser beam through said surface layer without damaging said elastic material, said colored surface layer being a color other than black or gray;

irradiating portions of said intermediate layer with said laser beam to remove said portions of said intermediate layer in the shape of characters or figures and at the same time, burning up and removing said surface layer in the shape of the characters or figures by said burning of said intermediate layer.

8. The method in accordance with claim 7, wherein:

said intermediate layer is formed of a material to burn up and withdraw from said colored translucent or transparent layer when irradiated by the laser beam.

9. The method in accordance with claim 7, wherein:

said intermediate layer and said colored surface layer are formed of a material and thickness to have burning up and removal of said intermediate layer by the laser cause removal of said colored surface layer adjacent burned portions of said intermediate layer.

10. The method in accordance with claim 5, wherein:

said irradiating passes the laser beam through said surface layer without substantially directly removing said surface layer by said laser beam. intermediate layer.

11. The method in accordance with claim 7, wherein:

said elastic material is selected from a group consisting of natural rubber (polyisoprene rubber), butadiene rubber, styrene butadiene rubber, chloroprene rubber, nitryl rubber, butyl rubber, ethylene propylene rubber, acrylic rubber, silicone rubber, fluoric rubber, urethane rubber, styrene base thermoplastic elastomer, olefin base thermoplastic elastomer, ester base thermoplastic elastomer and urethane base thermoplastic elastomer.

* * * * *